United States Patent [19]

Thackston et al.

[11] Patent Number: 5,401,100
[45] Date of Patent: Mar. 28, 1995

[54] AXILLARY THERMOMETER PACKAGING

[75] Inventors: Thomas Thackston, Moorestown; Gary Focarino, Lodi, both of N.J.

[73] Assignee: Pymah Corporation, Flemington, N.J.

[21] Appl. No.: 210,504

[22] Filed: Mar. 18, 1994

Related U.S. Application Data

[63] Continuation-in-part of Ser. No. 992,919, Dec. 18, 1992, abandoned.

[51] Int. Cl.⁶ .............. G01K 1/14; G01K 11/06; G01K 11/12; G01K 11/16; B65D 85/38
[52] U.S. Cl. .................. 374/208; 206/306; 128/736; 383/211; 374/160; 374/162
[58] Field of Search .......... 374/158, 160, 162, 208, 374/209; 206/306, 484; 128/736; 383/210, 211

[56] References Cited

U.S. PATENT DOCUMENTS

| | | | |
|---|---|---|---|
| 3,460,742 | 8/1969 | Langdon | 383/211 |
| 3,630,346 | 12/1971 | Burnside | 206/484 |
| 3,847,280 | 11/1974 | Poncy | 206/306 |
| 3,910,410 | 10/1975 | Shaw | 206/306 |
| 4,136,776 | 1/1979 | Poncy | 206/306 |
| 4,164,285 | 8/1979 | Dorman | 206/306 |
| 4,232,552 | 11/1980 | Hof et al. | 374/162 |
| 4,234,084 | 11/1980 | Hutten | 206/306 |
| 4,410,130 | 10/1983 | Herrington | 383/211 |
| 4,459,046 | 7/1984 | Spirg | 374/162 |
| 4,509,533 | 4/1985 | Chervitz | 374/162 |
| 5,094,545 | 3/1992 | Larsson et al. | 374/162 |

FOREIGN PATENT DOCUMENTS 2010677  9/1971  Germany .............. 206/306

Primary Examiner—Diego F. F. Gutierrez

[57] ABSTRACT

A package for adapting a chemical thermometer to axillary use comprising a substrate coated with a release agent, a clinical chemical thermometer disposed on the substrate and a transparent overlayer film having a surface of the film coated with a pressure sensitive adhesive, the adhesive coated surface being in juxtaposition with the oral thermometer and the release agent coated surface of the substrate, thereby, adhering the thermometer to the overlayer film and sealing the thermometer within the package formed by the substrate and the overlayer film, the overlayer film being releasably adhered to the substrate.

16 Claims, 3 Drawing Sheets

AXILLARY THERMOMETER PACKAGING

CROSS-REFERENCE TO RELATED APPLICATIONS

This application is a continuation in part of U.S. Patent Application No. 07/992,919, for AXILLARY THERMOMETER PACKAGING filed Dec. 18, 1992, now abandoned.

FIELD OF INVENTION

This invention relates to a package for an oral thermometer. In particular, it relates to packaging for chemical type oral thermometers useful as an axillary thermometer.

BACKGROUND OF THE INVENTION

This invention relates to a novel method of packaging a chemical type thermometer which makes it usable as an axillary thermometer. The term "chemical thermometer" as used in the specification and claims means the prior art non-mercury thermometers which depend on the melting or change of state of a thermally responsive material for temperature indication. The term includes liquid crystal thermometers as well as thermometers which produce a signal utilizing a chemical compound melting at a predetermined temperature. A commercial thermometer of the latter type is sold under the trademark TEMPA.DOT ® by Pymah Corporation.

U.S. Pat. No. 3,946,612 to Sagi, 3,956,153 to Chadha and 3,980,581 to Godsey, all of which are incorporated herein by reference, disclose a chemical thermometer utilizing solid solutions of ortho-chloronitrobenzene and ortho-bromonitrobenzene as the temperature responsive composition melting at a predetermined temperature. The thermometer of those patents comprises a substrate which has been embossed to accept the temperature sensitive composition. The composition has incorporated therein a nucleating agent which is preferably anthraquinone. A clear cover layer is disposed over the substrate, the cover layer having indicating dots of paper containing a dye layer, disposed on the cover layer so as to fit into the embossments. When the indicating chemical melts it is wicked up through a first layer of paper into a dye containing layer, and subsequently, through an upper layer so that the signal can be observed. In order to prevent "firing" as a result of temperature excursions the substrate and the cover layer are separated from one another until use. A plastic, pressure sensitive adhesive coated film is adhered to both the substrate and the cover layer. At the time of use the plastic film is stripped away in a manner so as to bring together the cover strip and substrate with the indicating paper dots in juxtaposition with the embossed pockets. See for example U.S. Pat. Nos. 3,712,141 to Chadha, and 3,677,088 to Lang, both incorporated herein by reference for a description of the mechanism for accomplishing this result. U.S. Pat. No. 3,677,866, to Pickett, et al., incorporated herein by reference, discloses a package for utilizing the thermometer device of Lang '088.

An improved disposable thermometer utilizing the solid solutions of Sagi, '612, is disclosed in U.S. Pat. No. 4,232,552, to Hof, incorporated herein by reference. The Hof device eliminates the nucleating agent so that the signal obtained will remain for a time sufficient to read the thermometer. A dye, or combination of dyes, is incorporated into the solid solution the solid solution/dye system exhibits a first color when the solid solution is in the solid state and a second color when the solid solution is in the liquid state.

In an earlier version of chemical thermometers, U.S. Pat. No. 3,465,590, to Kluth discloses a device wherein the embossments are filled with fatty acid material which are opaque in the solid state, but transparent when melted. The embossment has a color or number message in the bottom which becomes visible when the fatty acid is melted.

Another embodiment of the chemical thermometers of the prior art is the liquid crystal thermometer. This embodiment utilizes cholestryl liquid crystals which change color in response to temperature changes. See for example U.S. Pat. Nos. 3,974,317 and 4,064,822 incorporated herein by reference. Liquid crystal thermometers have been utilized as thermometers for infants by applying an adhesive to the back of the thermometer and applying it to the forehead.

The above described chemical thermometers are illustrative, non-limiting examples of such thermometers. The chemical thermometers, per se, are admitted prior art.

With the exception of the liquid crystal thermometer designed as a "patch" with adhesive backing, these thermometer were designed to be oral thermometers. Some have been adapted for use as rectal thermometers, by utilizing a special adapter. Others, have been utilized as axillary thermometers. For example, the thermometer of Hof has been utilized as an axillary thermometer by taping under the arm using transparent adhesive tape. This method has the disadvantage of being a makeshift approach which can result in poor placement of the thermometer or inadequate contact with the axillary area. What is needed, and forms the basis of this invention, is a more certain method of utilizing the oral chemical thermometers of the prior art as axillary thermometers.

SUMMARY OF THE INVENTION

A package for a clinical chemical thermometer comprising a backing of a releasing agent coated material having clear overlayer of polymeric film coated with a pressure sensitive adhesive, a clinical chemical thermometer being disposed between the backing and the clear overlayer. The thermometer is adhered to the overlayer by the adhesive. In use the overlayer with the accompanying thermometer is stripped from the backing and applied to the axillary area of a patient whose temperature is to be measured.

BRIEF DESCRIPTION OF THE DRAWING

FIG. 5A shows a plan view of the package of this invention comprising the backing, overlayer and an oral thermometer, while

DETAILED DESCRIPTION OF THE INVENTION

Figure 1:
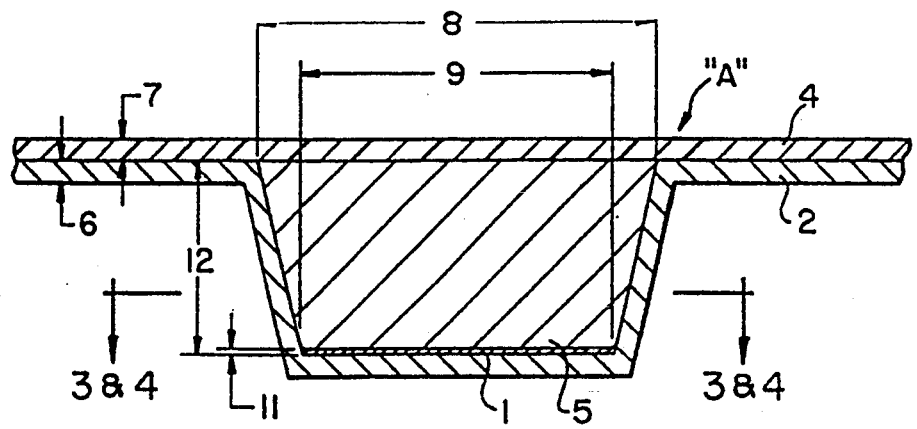
FIG. 1 is a partial plan view from the horizontal of flat or graduated curved prior art heat-conducting carrier having a cavity defined therein, which cavity forms an enclosure for a temperature sensitive "classical" composition of matter therein when such cavity is covered by a transparent cover sheet means in sealing engagement with carrier means overlaying the heat conducting carrier means and above the cavity.

This invention relates to a package for a clinical chemical thermometer. In particular it relates to a package which permits a chemical thermometer to be readily adapted to axillary use.

The package of this invention comprises a chemical thermometer, a backing of a releasing agent coated substrate material having a clear overlayer of polymeric film coated with a pressure sensitive adhesive, the chemical thermometer being disposed between the backing and the clear overlayer. The thermometer is adhered to the overlayer by the adhesive. In use the overlayer with the accompanying thermometer is stripped from the backing and applied to the axillary area of a patient whose temperature is to be measured.

Illustrative, non-limiting examples of materials suitable for use as the substrate are paper, polymeric film such as polypropylene, polyethylene, polyvinylchloride, polyester resin, etc.; metal foil, e.g., aluminum foil; paper backed metal foil or combinations and laminates of the foregoing materials. The release agent can be any of the well known compounds utilized commercially as release agents. Illustrative non-limiting examples of such release agents are silicones and polyfluorocarbon polymers. In one embodiment the substrate can be coated with a polymeric film with releasing properties, e.g., polyfluorocarbons. The term "release agent", as used in the specification and claims, means any of the prior art materials which, when applied to the substrate, will permit easy release of the pressure sensitive adhesive coated overlayer from the substrate.

The chemical thermometer can be any oral thermometer of the prior art. The preferred oral thermometer is a thermometer of the type disclosed by Hof in U.S. Pat. No. 4,232,552, incorporated herein by reference, wherein the solid solution is a mixture of ortho-chloronitrobenzene and ortho-bromonitrobenzene, and the dye is pinacyanol iodide. For a complete understanding of the thermometer of the Hof '552 invention so much of the '552 patent as is necessary is produced substantially verbatim below.

Throughout the Detailed Description below, the terms "novel thermally-responsive substance", "novel thermally-responsive material", "novel temperature-indicting compositions of matter", "novel temperature-sensitive solid solutions", "novel temperature-indicating solid solutions", and "novel solid solutions", or variations thereof, are used interchangeably to denote the same novel materials of the Hof '552 invention. Otherwise, the term "compositions of matter" or "classical compositions of matter" are used interchangeably to denote compounds which change only from being opaque to transparent with a corresponding change from the solid to liquid state, or vice versa.

1. Compositions of Matter

The discovery disclosed in the Hof et al. '552 patent is that certain organic compounds (to be described hereinafter) form novel solid solutions which undergo a change in state from solid to liquid at precise and predetermined temperatures with a corresponding change in color visible to the naked eye, and likewise form liquid solutions which undergo a change in state from liquid to solid at a predetermined temperatures with a corresponding change in color visible to the naked eye. The term "solid solution" is well known and usually refers to a homogeneous solution of one solid in another. The novel solid solutions contemplated in the present invention are composed of two or more, preferably three or four, different organic compounds with varying proportions of at least two compounds which form a solvent for the solution. Each novel solid solution undergoes a rapid change of state at a predetermined temperature or substantially thereabouts. By a "change in color visible to the naked eye" of a source we mean a change in the wavelength of luminous flux of light (from the source distributing or reflecting such energy in the region of the Electromagnetic Spectrum from about 3900 Angstrom units to about 7600 Angstrom units before or after the change, or preferably both) visible to a person of normal vision and eyesight wherein the intensity of the luminous flux surrounding the source is more than or about 5 lumens per square food (ft-c). in most instances, this change in the wavelength of luminous flux to the eye will be at least about 175 Angstroms, and preferably at least about 500 Angstroms. Preferably, when a small but effective amount (generally a weight fraction from about 0.005 to 0.2 weight percent, and generally about 0.05 weight percent of the entire composition, but the optimum may be more or less upon experimentation, depending on the below described Group I-III compounds, selected and the solvent selected, up until both phases appear dark, appear the same color, or the melting point becomes too broad for the use desired—some latitude for experimentation is present here) of one or more of Group III compounds comprising: pinacyanol iodide, 1,1'-diethyl-2,2'-cyanine iodide, quinaldine red, pinacyanol chloride, thionin, methylene blue, cresol red, chlorophenol red, neutral red iodide, neutral red chloride, crystal violet, acridin orange, Orasol Orange RLN TM, Orasol Navy Blue TM, Irgalith Red PR TM, Fat Red BS TM, Xylene Cyanol FF TM, Rhodamine B, Rhodamine 6G TM, Irgalith Magenta TCB TM, Irgalith Pink TYNC TM, Toluidin Blue O TM, Savinyl Green B, Savinyl Blue RS TM, purpurin, 3.3''-diethyl-thiadicarbocyanine iodide, cryptocyanine, Dicyanine A TM, Merocyanine 540 TM, 4-(p-ethoxyphenylazo)-m-phenylene diamine monohydrochloride, Yellow Orange S TM, Chrysoidin G TM, fuchsin, aurintricarboxylic acid (ammonium salt), Victoria Blue R TM, Pyronin G TM, gallein, Erythrosin Yellowish Blend TM, chlorophenol blue, bromophenol blue, bromocresol purple, Coriphospine O TM, acriflavin, acridine orange, rhoduline violet Alizarin cyanin 2R TM, Alizarin Red S TM, alcannin, Aurantia TM, Direct Green G TM, Fast Red Salt 3GL TM, Fast Blue Salt BB TM, Fast Garnet Salt GBC TM, Carta Yellow G 180 o/o Murexide, Savinly Blue GLS TM, Irgalith Blue GLSM TM, phthalocyanine, Di Amingreen B ™, Alizarin Blue S, Celiton Blue Extra ™, neocyanine, Janus Green ™, dimethyl yellow, Fast Yellow, Methyl red sodium salt, Alizarin yellow R ™, Eriochrome black T ™, Chromotrope 2R ™, Ponceau 6R ™, Brilliant Ponceau G/R/2R ™, chromolan yellow, Sudan red B ™, Bismarck brown G ™, Fat Black ™, Resorcin Brown ™, Benzofast pink 2BL ™, Oil Red EGN ™, Euroglaucine, Fuchsin NB ™, parafuchsin, Patent Blue ™, Irgalith Blue TNC ™, Phloxin B ™, fluorescein sodium salt, Rhodamine B base ™, Eosinscarlet, Eosin Yellowish ™, Erythrosin extrabluish, 4,5-dibromofluorescein, ethyleosin, Phloxine ™, Cyanosin B ™, chlorocresol green, pinacyanol bromide, 2-(p-diethylaminostyryl)-1-ethyl pyridinium iodide, ethyl pyridinium iodide, ethyl red, nigrosine, savinyl blue B ™, Orasol Blue BLN ™, Safranin O ™, Solophenyl Brilliant Blue BL ™, Nile Blue A ™, gallocyanine, gallamine blue celestine blue, methylene green, Azure A/B/C ™, Blue VIF ™, Organol ™, Alizarin Nitrofast Green GSB ™, quinalizarine, Oil Blue N ™, Solvay purple, Ciba Blue ™, Indigo synthetic ™, Chromophtal Bordeaux RS ™, Acid Alizarin Red B ™, 5-Aminofluorescein, Rose Bengal ™, Martius Yellow ™, Chicago Blue 6B ™, Alcian blue 8GX ™, cresyl violet, 4,4'-Bis(dimethylamino)benzylhdrol, Zinc Pthalocyanine, Sudan III ™, Pyronin Y ™, Toluylene Blue ™, Cresyl Violet perchlorate, Mendola's Blue ™, 3,3'-diethylthiadicarbocyanine iodide, Phosphine Dye ™, Nitron ™, cresyl violet acetate, Ceres Orange R ™, 4-phenylazo-1-naphtylamine, 4-(4-Dimethylamino-1-naphtylazo-3-methoxybenzene sulfonic acid, Bindschedler's Green ™, and p-(p-dimethylaminophenylazo)benzoic acid, or one of the other organic moieties to be described (one or more Group I compounds with one or more Group II compounds) is combined with a-suitable solvent, for example, a pure mixture of ortho-chloronitrobenzene (OCNB) and ortho-bromonitrobenzene (OBNB) for use in clinical applications. The temperature of the change of state of a number of solid solutions with a corresponding change in color may be accomplished at approximately 1/10° C. or 2/10° F. intervals, i.e., a change of state of one novel temperature-sensitive composition of matter at a temperature 1/10° C. or 1/5° F. different from the temperature of chance in state of another novel composition of matter in an adjacent region containing another proportion of the same organic moieties in ortho-chloronitrobenzene and ortho-bromonitrobenzene. Thus, for example, in human clinical applications where temperature measurements in the range of 96° F. to 105° F. (or from 35.5° C. to 40.5° C.) are usually desired, 45 to 50 different solid solutions differing In their percentage compositions but otherwise made from the same two components) will provide all of the necessary temperature gradations at increments of 2/10° F., i.e., 96.0°, 96.2°, 96.4°, etc., up and including 104.8° F., or in the alternative 35.5°, 35.6°, 35.7°, up and including 40.4° C. The solution of ortho-chloronitrobenzene and orthobromonitrobenzene, when the ortho-bromonitrobenzene varies from 56.2 weight percent to 96.0 weight percent, provides an excellent starting mixture for determination of temperatures in the human clinical temperature range. Usually the addition of the Group I-III organic moieties (hereinafter sometimes "organic moieties") consisting of a small but effective percentage of one or more of the aforesaid Group III compounds, or a combination of one or more Group I compounds with one or more Group II compounds affects the temperature curve of the solid solution by only a small Increment which is substantially constant along the entire curve. Regardless of the solvent system selected for a given predetermined temperature range, it is necessary that the organic moieties selected for the color change constitute a small but effective amount of moieties, e.g., at least that amount sufficient to provoke a color change visible to the naked eye, and preferably up to a saturated solution of Group I-III-organic moieties, and most preferably about 0.005 to about 0.2 weight percent of an inert, preferably aromatic solvent constituents, constituting the remaining balance of the mixture. The Group I-Group III moieties may In some instance exceed 0.2 weight percent as long as the melting point remains sharp and both phases are not so dark as to eliminate a color change visible to the naked eye. If too small an amount of organic moieties is employed, the colors and the color change are too faint under weak light; if too large an amount is employed, the colors are too dark and the color change is harder to visualize and there is a possibility that the sharpness of the melting point will be affected. It is also noted that the organic moieties and suitable solvent to be described should be substantially free of impurities, generally, such impurities should be kept less than three tenths of one percent of the entire composition. Supersaturated solutions are not preferred for reasons to be enumerated below.

The dye systems (organic moieties) of the '552 patent are useful in the practice of this invention, and are incorporated into the solid solutions at a preferred concentration about 0.03 wt. % to about 0.15 wt. % based on the weight of solid solution plus organic moiety; more preferably at about 0.035 to about 0.1 wt. %.

It must be emphasized from the outset that once a proposed solvent system has been selected (consisting of one or more compounds) for the temperature(s) to be determined, the compound(s) of the system must be tested for the Group I-III moieties for stability (i.e., inertness) and solubility of the Group I-III moieties in the compound(s) of the solvent. This must be done by routine testing, within the skill of those in the art. Only after the solvent system compound(s) are shown to dissolve the Group I-III moieties and be inert towards them, can such a solvent system be suitable for our invention.

Those skilled in the art will appreciate that organic compounds, unlike crystalline materials, exhibit a melting point range rather than a sharp melting point. For example the OCNB and OBNB exhibit a melting point range of about 0.2° F. Temperature readings of within about 0.2° F. or 0.1° C. are achieved by selecting completion of melt temperature differentiated from one another by the incremental reading desired.

While sometimes under fortuitous circumstances the solvent system may consist of only one compound, in most instances (as those skilled in the art will appreciate) the temperature to be determined will not be readily obtainable without mixing two or more organic compounds for the solvent system. Hence, for a temperature-indicating device, two or more related organic compound constituents in the solvent are especially helpful for measuring forty or more temperatures located at regular increments.

It is apparent from the foregoing description that the selection of one or more inert solvents towards the organic moieties for use in the novel composition of matter requires judicious and careful scrutiny, since not all organic compounds are useful for this purpose and many may fall outside a desired temperature range. A suitable solvent may be any solvent which is inert towards the organic moieties and in which the organic moieties are soluble while the solvent is in the liquid phase. In some instances, simple alcohols and other organic substances may be suitable rather than aromatic compounds. The organic compounds which are particularly adapted for the formations of solid solutions which can serve a novel temperature-indicating composition in accordance with the present invention are generally those which are immiscible in water and have a dielectric constant less than about 35) or moderately polar aromatic organic compounds, as well as the requirements of organic moiety solubility and inertness towards the organic moieties. Thus, it has been discovered that weakly polar or moderately polar aromatic organic compounds, which have analogous chemical structures (e.g., analogs, homologs and optical isomers), have substantially the same molecular volume or have similar crystalline structures (e.g., isomorphous) and which form the novel solid solutions useful for solvent system constituents in preparing a grid of novel composition of matter to be used in predetermined temperature range for the determination of a temperature falling within said range. In addition, it is preferable that the solvent solutions have a linear or a substantially linear temperature composition liquidous curve, particularly over the desired temperature range such as, for example, over the human clinical temperature range.

Exemplary weakly polar or nonpolar aromatic solvents are ortho-chloronitrobenzene, ortho-bromonitrobenzene, naphthalene, 2-ethoxybenzamide, 1-thymol, 2-naphthol, ortho-iodonitrobenzene, meta-iodonitrobenzene, para-iodonitrobenzene, para-dibromonitrobenzene and para-toluic acid. It must be emphasized, of course, that a suitable solvent useful for one selection of organic moieties may not be useful for another, and that an operable solvent at one temperature range may not work at a different range. It is recommended that for a given temperature to be measured, one may start his investigation for the appropriate temperature(s) to be determined a suitable solvent system selected from compounds from the following:

(1) moderately polar or weakly polar aromatic compounds, i.e., compounds having a dielectric constant of less than about 35;
(2) water; or
(3) aromatic and aliphatic compounds other than (1)–(2) which are germane to the temperatures to be determined, and which are "inert" to the Group I-III dyes.

The constituents of the novel compositions of matter comprise:
(1) a solvent (I) consisting of a single substance or a mixture of substances and adapted to change from a solid state at substantially a predetermined temperature to a liquid state and
(2) an indicator system (II) consisting of one or more substances different from (I), characterized in that
    (a) (II) is soluble in (I) when the latter is in the liquid phase, and
    (b) (II) changes color visible to the naked eye when (I) passes from the solid to the liquid phase or from the liquid to the solid phase.

It is well within the range of knowledge of those skilled in the art to find for a given temperature range to be measured, and for color change desired (choosing from the various Group I-III compounds) a suitable solvent, i.e., one which is inert toward the Group I-III compounds and for which the latter a soluble in the liquid phase to said solvent.

The solid solutions made from ortho-chloronitrobenzene and ortho-bromonitrobenzene have been found to be most preferable for use in temperature measurements in the clinical range within the aforesaid accuracy. Of course, as it will be readily understood by those skilled in the art, any two or more aromatic solvents as defined above in which the organic moieties to be described below are soluble, stable and inert, may be employed for thermometers if adaptable to the temperature range to be tested, and if capable together of forming a homogeneous solid solution.

Preferably the novel composition of matter consists essentially of:
(A) a suitable solvent adapted to change from a solid state at a predetermined temperature to a liquid state, and
(B) an effective amount of one or more suitable organic moieties soluble in said solvent in the liquid state and adapted to change the color of the composition visible to the naked eye upon the change of state of the solvent at substantially the predetermined temperature and selected from one or more of the group consisting of
    (1) a group III body of single compounds consisting of the cyanine class of dyes, suitable dyes from the following classes: monoazo, diazo, triarylmethane, xanthene, sulphonephthalein, acridul, quinoline, azine, oxazine, thiazine, anthraquinone, indigold, and the following individual compounds: Aurantia TM, Orasol orange RLN TM, Diamin green B TM, Direct green G TM, Fast red salt 3GL TM, Fast blue salt BB TM, Fast Garnet salt GBC TM, Carta Yellow G 180 o/o TM, Murexide Savinyl blue GLS Irgalith blue GLSMv, Phthalocyanine and Alcannin,
    (2) mixtures of:
        (a) one or more organic acids compounds, having a pK of less than about four, and
    (3) mixtures of
        (a) one or more organic acids having a pK of less than about 2 and
        (b) one or more acid dyes or acid indicators
    (4) mixtures of
        (a) one or more organic acid compounds having a pK of less than about 4 and
        (b) one or more members of the group I body of compounds,
    (5) mixtures of
        (a) one or more basic dyes or basic indicators and
        (b) one or more members of the group I body of compounds,
    (6) mixtures of
        (a) one or more dyes having a molecular structure containing a lactone group, and
        (b) one or more acids having a pK of about 8 to about 12.

The compounds mentioned in group III are classified according to the Colour Index, 3rd Edition (1971), published by the Society of Dyers and Colourists, Great Britain and Conn's Biological Stains (9th Ed 1977).

Suitable monoazo dyes are: 4-(p-Ethoxyphenylazo)-m-phenylene-diamine monohydrochloride, Orasol Navy Blue TM, Organol Orange, Janus Green TM, Irgalith red P4R, Dimethyl yellow, Fast Yellow, Methyl red sodium salt, Alizarin Yellow R-, Eriochrome Black T, Chromotrope 2R, Ponceau 6R, yellow Orange S TM, Brilliant Ponceau 5R TM, Chrysolidin G TM, Eriochrome black A, Benzyl orange, Brilliant ponceau G/R/2R TM, and chromolan yellow.

Suitable disazo dyes are: Fat red BS TM, Sudan Red B TM, Bismarck Brown Gin, Fat Black TM, Resorcin Brown TM, Benzofast Pink 2BL TM, and Oil Red EGN TM.

Suitable triarylmethane dyes are: Methyl violet, Xylene cyanol FF TM, Erioglaucine TM, Fuchsin NB TM, Fuchsin, Parafuchsin, Aurintricarboxylic acid Ammonium salt, Patent Blue, Victoria blue R TM, Crystal violet and Irgalith Blue TNC TM.

Suitable xanthene dyes are: Phloxin B, Fluorescein sodium salt, Rhodamine B, Rhodamine B Base TM, Rhodamine 6G TM, Pyronin G, Irgalith Magenta TCB TM, Irgalith Pink TYNC TM, Eosin Scarlet TM, Eosin Yellowish Erythrosin extra bluish TM 4'5'-Dibromofluorescein, Ethyl eosin, Gallein, Phloxine TM, Erythrosin yellowish Blend TM, and Cyanosin B TM.

The suitable sulphonephthaleins are cresol red, chorophenol red, chlorophenol blue, bromophenol blue, bromocresol purple and chlorocresol green.

The suitable acridine dyes are: Corisphosphine O TM, Acriflavine and acridine orange.

The most suitable quinoline dyes are: pinacyanol chloride, pinacyanol bromide, pinacyanol iodide, quinaldine red, cryptocyanine, 1,1'-Diethyl-2,2'-cyanine iodide, 2-(p-Dimethylaminostyryl)-1-ethyl-pyridinium iodide, 3,3'-Diethylthiadicarbocyanine iodide, ethyl red, Dicyanine A, Merocyanine 540 TM and Neocyanine TM.

The suitable azine dyes are: Neutral red chloride, Neutral red iodide, Nigrosine TM, Savinyl blue B TM, Orasol blue BLN TM, Safranin O TM, Azocarmin G TM, Phenosafranine TM, Azocarmine BX TM, and Rhoduline violet.

The suitable oxazine dyes are: Solophenyl Brilliant Blue BL TM, Nile blue A TM, Gallocyanine TM, Gallamine Blue TM, and Celestine blue.

The suitable dyes are: Methylene blue, Thinonin Toluidine Blue O, Methylene Green and Azure A/B/C TM.

The suitable anthraquinone dyes are: Savinyl Green B TM, Savinyl Blue RS D+C Green 6 TM, Blue VIF Organol TM, Alizarin Alizarin Cyanine 2R TM, Celliton Blue Extra TM, Alizarin Blue S TM, Nitro Fast Green GSB, Alizarin red S, Chinalizarin, Oil Blue N, Solvay Purple TM and Purpurin TM.

The suitable indigold dyes are: Ciba Blue TM, Indigo Synthetic TM, Chromophtal Bordeaux RS TM, and Thioindigo red.

Instead of one or more group I compounds, to be used in the novel composition of matter, mixtures can be employed.

The group of organic acidic compounds with a pK less than about four generally consists of organic acids and/or the halogenated sulfonphthaleins, which are soluble in the selected solvent, when the latter is In the liquid state. Examples of these acids include oxalic acid, maleic acid, dichloroacetic acid, trichloroacetic acid, 2-naphthalene-sulphonic acid, chloroanilic acid, bromophenol blue, bromothymol blue, chlorophenol red, bromochlorophenol blue, bromocresol green, 3,4,5,6-tetrabromophenol-sulfonphthalein, bromophenol red, chlorocresol green, chlorophenol blue, bromocresol purple and 2,4-dinitrobenzenesulphonic acid.

The group of basic dyes or basic indicators are generally the aminotriphenyl methanes, also known as the triaryl methanes, or their soluble salts, 8-hydroxyquinoline and the quinoline dyes, preferably the cyanines. Examples are: basic fuchsin, pinacyanol iodide, pinacyanol chloride, pinacyanol bromide, 2-p-(dimethylaminostyryl)-1-ethyl-pyridinium iodide, crystal violet, cryptocyanine, dicyanine A, 3,3'-diethylthiacarbocyanine iodide, 1,1'-diethyl-2,2'-cyanine iodide, ethyl red, quinaldine red, ethyl violet, brilliant green, pararosaniline, pararosaniline acetate, 8-hydroxy-quinoline, 1-ethylpyridinium iodide and 5-(p-dimethylaminobenzilidine) rhodanine. Preferably the weight of the acid compounds is about three or more times the weight of the basic compounds.

The above-mentioned pK values refer to the pK values as measured in water. Generally it is preferred that the pK of the acidic compound is lower than the corresponding pK value of the basic compound. Preferably the acid compounds have a pK value less than about four and the basic compounds have a pK value less than about 5.

It should be noted that when the basic compound consists solely of one or more aminotriphenylmethanes or their soluble salts, the acid compound must be selected from the group consisting of tetrahalogenated sulphonephthaleins and the other organic acids having a pK of less than about 2.

Preferred combinations of acidic compounds having a pK less than about 4 and basic dyes or basic Indicators are bromophenol blue/basic fuchsin, chlorophenol blue/ethyl red and trichloroacetic acid/3,3'-diethylthiadicarbocyanine Iodide.

Mixtures of one or more organic acids having a pK less than about 2 and one or more acid dyes or acid indicators, used in the novel composition of matter, changes color when the solvent passes from the solid into the liquid phase or reversed. In this combination the acid dyes used are preferably halogenated sulfonphthaleins.

Mixtures of one or more organic dyes, having a molecular structure containing a lactone group and one or more acids having a pK of about 8 to about 12, used in a solvent also change color when the solvent passes from the solid phase onto the liquid phase or reversed. In that combination the preferred compounds are crystal violet lactone and one or more of acids such as phenol, bisphenol A, pyrocathechol or 3 nitrophenol.

The novel compositions of matter most preferably comprise (a) a suitable inert solvent as described above adapted to change from a solid state to a liquid state at substantially the predetermined temperature and (b) one or more organic moieties soluble in said solvent and adapted to change color upon the change in state of the solvent at substantially the predetermined temperature when so dissolved, and selected from:

(1) one or more Group III compounds consisting of pinacyanol iodide, quinalidine red, 1,1'-diethyl-2,2'cyanine iodide, pinacyanol chloride, thionin, methylene blue, cresol red, chlorophenol red, neutral red iodide, neutral red chloride, crystal violet, acridin orange, toluidin blue O, Orasol Orange RLN TM, Orasol Navy Blue TM, Irgalith Red PR TM, Fat Red BS TM, methyl violet, Xylene Cyanol FF TM, Rhodamine B TM, Rhodamine 6G TM, Irgalith Magenta TCB TM, Irgalith Pink TYNC™, Toluidin Blue O™, Savinyl Green B™, Savinyl Blue RS™, purpurin, 3,3'-diethylthiadicarbocyanine iodide, cryptocyanine, Dicyanine A, merocyanine 540, 4-(p-ethoxyphenylazo)-m-phenylene diamine monohydrochloride, Yellow Orange S™, Chrysidan G™, fuchsin, Aurintricarboxylic acid (ammonium salt), Victoria Blue R™, Pyronin G™, gallein phloxine, Erythrosin Yellow Blend™, chlorophenol blue, bromophenol blue, bromocresol purple, Coriphospine O™, acriflavine, acridine orange, rhoduline violet, Alizarin cyanin 2R™, Alizarin Red S™, alcannin, Aurantia, Direct Green G™, Fast Red Salt 3GL™, Fast Blue Salt BB™, Fast Garnet Salt GBC™, Carta Yellow G 180 o/o™, murexide, Savinyl Blue GLS™, Irgalith Blue GLSM™, phthalocyanine, Di Amingreen B™, Alizarian Blue S™, Celliton Blue Extra, neocyanine, Janus Green™, dimethyl yellow, Fast Yellow™, methyl red sodium salt, Alizarin yellow R™, Eriochrome black T™, Chromotrope 2R™, Ponceau 6R™, Brilliant Ponceau G/R/2R™, Chromolan yellow, Sudan Red B™, Bismarck Brown G™, Fat Black™, Resorcin Brown™, Benzofast pink 2BL™, Oil Red EGN™, Euroglaucine, Fuchsin NB™, parafuchsin, Patent Blue™, Irgalith Blue TNC™, Phloxin B™, fluorescein sodium salt, Rhodamine B base™, Eosinscarlet, Eosin Yellowish™, Erythrosin extra bluish, 4'5-dibromo fluorescein, ethyleosin, Phloxine™, Cyanovin B™, chlorocresol green, pinacyanol bromide, 2-p-dimethylaminostyryl)-1-1-ethyl pyridinium iodide, ethyl red, neutral red, iodide, nigrosine, Savinyl Blue B™, Orasol Blue BLN™, Safranin O™, Azocarnum G™, Phenosafranine, Azocarmine BX™, Solophenyl Brilliant Blue BL™, Nile Blue A™, gallocyanine, Gallamine blue, celestine blue, methylene green, Azure A/B/C™, Blue VIF Organol™, Alizarin, Nitrofast Green GSB™, quinalizarine, Oil Blue N™, Solvay Purple™, Ciba Blue™, Indigo Synthetic™, Chromophtal Bordeaux RS™, Thiorifolex™, Acid Alizarin Red B™, 5-aminoflourescein, Rose Bengal™, Martius Yellow™, Chicago Blue 6B™, Alcian Blue 8GX™, cresyl violet, 4,4'Bis(dimethylamino)benzylhydrol, Zinc Pthalocyanine, Sudan III™, Pyronin Y™, Toluylene Blue™, cresyl violet perchlorate, Mendola's Blue™, Phosphine Dye™, Nitron™, cresyl violet acetate, ceres orange R™, 4-phenylazo-1-naphtyl-amine, 4-(4-Dimethylamino-1-naptylazo)-3-methoxybenzene sulfonic acid, Bindschedler's Green™, and p-(p-dimethylaminophenylazo)benzoic acid (hereinafterwards referred to as the Group III compounds or Group III organic moieties), or (2) a binary mixture of:
(A) one or more of a Group I body of compounds (hereinafterwards referred to as the Group I compounds) consisting of (a) the organic acids, which when inserted in the solvent system at conditions other than supersaturation will yield a color change visible to the naked eye, and also have a pK of less than about four and (b) the halogenated sulfonphthaleins; and
(B) one or more of a Group II body of compounds (hereinafterwards referred to as the Group II compounds) consisting of the aminotriphenylmethanes and their soluble salts, 8-hydroxyquinoline, and the cyanines, with the proviso that if no Group III compound is present and if the Group II compounds must be selected from one or more of the group consisting of consist solely of one or more aminotriphenylmethanes or their soluble salts, then the Group I compound must be selected from one or more of the group consisting of oxalic acid, suitable sulfonic acids and the tetrahalogenated sulfonphthaleins, and other organic acids having a $pK_1$ of about or less than 2.

Of course, the primary application of the instant invention is where the change in state of the novel composition of matter is induced by temperature forces for use in a temperature-indicating device. By "suitable sulfonic acids" we mean sulfonic acids soluble in the selected solvent; these may be, for example, benzene sulfonic acid, naphthalene sulfonic acid, toluene sulfonic acid, anthracene sulfonic acid, etc., depending on the solvent.

An interesting phenomena exhibited by the novel compositions is illustrated by the example of a composition essentially consisting of pinacyanol iodide (at 0.035 weight percent) in ortho-bromonitrobenzene:ortho-chloronitrobenzene (75:25) solvent. In the liquid phase this composition is blue, and in the solid phase appears rose/tan. However, if the composition is chilled to a very low temperature at a very high rate of cooling initially, the color of the solid appears purple. As the composition is allowed to warm to room temperature, the color changes from purple to rose/tan, requiring about 3–5 minutes for the color to become rose/tan. (Similar phenomena have been observed with other novel compositions containing other Group III moieties or other Group I plus Group III combinations.

Another example of an especially preferred Group I compound is chlorophenol red at a concentration of about 0.05 percent by mass. When dissolved in a solvent such as OCNB/OBNB, dibenzofurane, para-toluic acid and other halogen nitrobenzenes, the liquid composition has a yellow color.

As enumerated above, in the absence of one or more Group III compounds to be used for the organic moieties in the solvent system, one or more of a Group I body of compounds must be employed together with one or more of a Group II body of compounds. The Group I body of compounds generally consist of (a) the organic acids, which when inserted in the solvent system (at conditions other than supersaturation) will yield a color change visible to the naked eye, and have a pK of less than about four, and (b) the halogenated sulfonphthaleins which are soluble in the selected weakly polar or nonpolar aromatic solvent described below. Preferably, the Group I compound has a pK of between zero and three, and most preferably between about zero and about two. Example of this Group I body of compounds include oxalic acid, naphthalenesulfonic acid, trichloroacetic acid, bromophenol blue, bromothymol blue, chlorophenol red, bromochlorophenol blue, bromocresol green, 3,4,5,6-tetrabromophenol sulfonphthalein, bromophenol red, and chlorocresol green. Some compounds, such as maleic acid, will work if soluble in the predetermined solvent system employed if the correct Group II compound is chosen.

These first groups of compounds, which are generally the halogenated-sulfonphthaleins, are derivatives of the sulfonphthaleins in the following ways: first the unsubstituted compounds are diprotic acid/base indicators, each having pK values of (1) a $pK_1$ of about 2 and (2) a $pK_2$ of about 7 to about 9. The halogenated derivatives show only one pK which is much lower than the $pK_2$ of the unsubstituted sulfonphthalein. Because there are halogen substituents on the sulfonphthalein molecule, it is our belief (while we do not limit the invention to the validity of our theory) that the pK value is reduced and the acid strength of the Group I is increased. As a consequence of this, the halogenated derivatives will respond in combination with one or more of the Group II compounds enumerated below to produce the color reaction. For example, in a OCNB-OBNB solvent system and in combination with basic fuchsin (a Group II material), bromochlorophenol blue (a Group I material) gives a green color in the solid phase and a strikingly red color in the liquid phase. This is very similar to the color found when the bromophenol blue (a Group I compound) is combined with basic fuchsin in the same ortho-chloronitrobenzene: ortho-bromonitrobenzene solvent system.

The Group II compounds, which are generally the aminotriphenylmethanes, their soluble salts, 8-hydroxyquionline, and the cyanines, act in our opinion as constituents which perform a "dye" function. Of course, as indicated by the disclosure above, a Group I compound may also act as a "dye" function. Examples of Group II compounds include ethyl red, crystal violet, pararosaniline (or "para Rosaniline Base"), pararosaniline acetate (or "para Rosaniline acetate"), basic fuchsin, 8-hydroxyquinoline, ethyl violet, brilliant green, pinacyanol chloride, and 3,3-diethylthiodicarbocyanine iodide. The Group I compounds are preferably selected from the group consisting of bromophenol blue, bromochlorophenol blue, and bromothymol blue. One will notice that the second group of compounds generally consist of dyes which have basic nitrogen groups either as substituent amines or in heterocyclic rings. In general, the addition of one or more of the first group of compounds along with the second group of compounds to a solution of the previously described nonpolar or weakly polar aromatic solvent(s) such as ortho-chloronitrobenzene and ortho-bromonitrobenzene solutions will provide a color difference between the solid and liquid phases of the aromatic solvent. It is preferred that the total weight of the Group I and Group II compounds be about 0.025 to about 0.05 total weight percent of the entire weight of the novel composition of matter. It is advised that the melting point of the Group III or Group I and Group II moieties be more than the melting point of the solvent system. It is preferred that the melting point of each of the Group I and Group II constituents be substantially more than the melting point of the solvent system selected, and it is much preferred that these Group I and Group II compounds melt at more than sixty degrees above the melting point of the solvent system. A basic requirement is that at least one of the Group I and Group II compounds reflects or absorbs light in the visible area of the spectrum at or below the melting point of the solvent system or, in the alternative, at or above the melting point of the solvent system, or both, in different colors so that a change in color is visible to the naked eye. It is also preferred that the Group I compounds weigh three or more times the weight of the Group II compounds. While 0.05 weight percent of the total of the Group I and Group II compounds or Group III compound(s) is most preferred, any effective amount from the smallest for which the change in color is visible to the naked eye upon change in phases is satisfactory, and certainly no more than the solubility limits of the Group I and Group II compounds (or Group III compound(s)) in the solvent system at the melting point might also be affected. A supersaturated solution of Group I and Group II compounds (or Group III compound(s)) in the solvent system, is not preferred, since Group I-III compounds are substantially more expensive than the solvent system constituents and an excess of them will be extravagant. Any pressure may be employed in making or in using the novel composition(s) of matter in a temperature-indicating device so long as the solvent does not generate a substantial vapor in the application for the composition. If a Group III compound is not employed, it is preferred that the Group I compound have a lesser $pK_1$ and $pK_2$ value than the corresponding pK values of the Group II compound. Preferably, the Group II compound should have a $pK_1$ value of less than about 5, and the Group I compound should have a $pK_1$ of less than about 4.

As it will be appreciated by those skilled in the art, it is possible with the disclosure given above to combine almost any Group I compound indicated pK, which is soluble in the solvent system selected, (a solvent system of ortho-bromonitrobenzene: ortho-chloronitrobenzene, for example) and a complementary acid base material from Group II and generate practically any desired change in color. The considerations for those skilled in the art will be (1) the selection of Group III and/or Group I and Group II compound(s) which yield a satisfactory change in predetermined colors; (2) that these compounds are soluble in the solvent system in the liquid state; (3) that the solvent system be properly determined for the temperature range desired; (4) that the Group I and/or Group II compounds (or Group III compounds) be soluble in the desired system, and (5) if pertinent, that one compound of the Group I compounds react as a strong acid against one or more of the Group II compounds in the solvent system.

As it will be recognized by those skilled in the art, one may employ combinations of more than one Group III moiety, or a combinations of more than one Group III moiety, or a combination of a Group III moiety and a Group I moiety, or a combination of a Group II moiety and Group III moiety, or more than one Group I moiety with more than one Group II moiety to obtain color shifts generally not found in a single system, e.g., a mixture of pinacyanol iodide and quinaldine red (two Group III compounds) yields a tan solid and deep dark purple liquid. There are some instances where two Group I compounds may be operable where one acts as an acid relative to the other e.g., (1) naphthalene sulfonic acid and one or more of (2) bromochlorophenol blue, chlorophenol blue, or bromocresol purple.

As an alternative to using one or more of the Group II compounds with one or more of the Group I compounds, one may select one of the aforesaid Group III compounds with (or preferably) in place of a combination of one or more Group I compounds and one or more Group II compounds. A caveat and proviso must be stated: in absence of a Group III compound one must employ one or more Group I compounds with one or more Group II compounds; if the Group II compounds consist solely of one or more aminotriphenylmethanes or their soluble salts, then the Group I compound must be from one or more of the group consisting of oxalic acid, suitable sulfonic acids, tetrahalogenated sulfonphthaleins, and other soluble strong organic acids having a $pK_1$ of about or less than 2.

Another example of a Group I compound and a Group II compound is bromophenol blue and basic fuchsin. In the solid form, the basic fuchsin behaved as if it were at a very low pH and was in a form which has a green color between its $pK_1$ and $pK_2$. This green color of basic fuchsin at very low pH is a little known fact, but can easily be demonstrated in any laboratory with common reagents. In the liquid form, however, the bromophenol blue is yellow. The basic fuchsin was not in its first acid form and became red. Thus, the color of the liquid was red.

As will be appreciated by those in the art, generally the color of the liquid is the same or similar to the color of the Group II compound or Group III compound when dissolved in the liquid phase of most of the suitable solvents employed.

Similarly, crystal violet, which is a pH indicator having a $pK_1$ of approximately 1, forms, in combination with oxalic acid and dissolved in the OCNB/OBNB solution, a blue liquid and a yellow solid.

It has also been found as well that (1) quinaldine red (a Group III compound) which has a $pK_1$ of approximately 1.6; (2) ethyl violet, which has a $pK_1$ of about 1.2; and (3) brilliant green, which has a $pK_1$ of about 1.4, all react in solutions with naphthalenesulfonic acid to form different colored solid- then liquid-phases.

As alternative to the above for Group I Group II combinations, when the Group I material is other than a simple acid, and is a "dye" compound (such as bromophenol blue), in addition to the Group I's behavior as an acid, there may be formed in the composition aggregates, mixed polymers, and the like, which cause what is referred t in the literature as "metachromism" or "metachromacy". "Metachromacy" is that property of a substance which is expressed as a change in color (according to the wavelength of the light in which it is viewed) due to an outside force. "Metachromacy" is mainly attributed to that color change phenomena when a dye is brought together with certain "tissue" molecules (macromolecules, e.g., solid materials such as heparin, polysaccharides). Certain organic dyestuffs, however, are characterized by different colors when dissolved in inert solvents, which is described as "solvatochromism". See HACKH'S CHEMICAL DICTIONARY 421 (4th Ed. 1969).

Once the organic moieties Group III compounds and/or Group I and Group II compounds are determined for the desired color change, they are added to a liquid mixture of the solvent constituents for the predetermined temperature and mixed, preferably by any suitable industrial mechanical mixing means known to those in the art, until a substantially complete dissolution has been obtained.

After the solvent weight fractions have been determined and the novel composition of matter formed for each of the increment temperatures to be tested, a suitable temperature-indicating device is constructed such as the novel device described below having a plurality of temperature-sensitive regions, preferably having cavities in a heat-conductive carrier such as aluminum wherein each novel composition of matter corresponding to one of the preselected points along the temperature curve fills one of the regions, preferably a cavity, in the heat-conductive carrier device. A method and apparatus for depositing precisely metered quantities of a temperature-sensitive composition of matter on a surface is taught by Pickett, et al, U.S. Pat. No. 3,810,779 (1974), incorporated herein by reference, and the techniques of that patent are incorporated herein as much as copied verbatim. A preferable device for sealing a heat sensitive transparent cover sheet means in vacuum sealing engagement with an aluminum heat-conductive carrier over cavities in the carrier is the Webb Model No. 2 machine manufactured by Bio-Medical Sciences, Inc., in Fairfield, N.J.

2. Temperature Indicating Device

In FIG. 1, a novel temperature-indicator device is disclosed comprising a flat, gradually curved, or substantially curvilinear heat-conducting carrier means having one or more spaced cavities defined herein to determine a like number of predetermined temperatures in a temperature range by means of a like number of different thermally responsive composition of matter. Each of the predetermined temperatures is associated with a composition of matter that is substantially without impurities, and may or may not be the novel compositions of matter stated above, but a composition of matter which does change from an opaque form when solid to a transparent liquid upon melting. The novel temperature-indicating device comprises (1) a flat, gradually curved, or substantially curvilinear heat conducting carrier with one or more cavities indented therein; (2) (in the absence of employing the novel compositions of matter of this invention) an indicator means located at the bottom of each of said cavities; (3) a transparent cover sheet means in sealing engagement with the carrier means above and overlying each of said cavities to form an enclosure between the walls of the cavity and the transparent cover sheet means; and (4) a composition of matter which substantially fills the cavity and is adapted to change from a solid to a liquid at substantially the predetermined temperature associated with said cavity, except for a substantially spherical void in the composition of matter between the bottom of the cavity and the transparent cover sheet means.

Referring to FIG. 1, one will notice that colorant 1 fills the bottom of a cavity "A" in a flat heat conducting carrier means 2 of width 6 which means is substantially filled with a "classical" solid solution 5. The cavity "A" is covered by a transparent cover sheet means 4 which fits in sealing engagement with heat conducting carrier means 2 immediately surrounding cavity "A" and covering the solid solution 5 filling cavity "A". Within solid solution 5 is a substantially spherical cavity 3 which has a diameter 10 only slightly smaller than the width 12 of the cavity minus the small width 11 of the colorant 1. In the preferred embodiment shown in FIG. 1, the carrier means cavity is in the shape of a trapezoid rotated around its axis, having a large diameter 8 at the top of the cavity and a smaller diameter 9 at the bottom of the cavity. The width 7 of the transparent film 4 is preferably substantially equal to the width 6 of the heat conducting carrier means 2. While the exact dimensions (6,7,8,9,11,12) of a cavity in items such as those in FIG. 1 vary with the solvent system employed, the materials selected, and the composition of matter which is predetermined (whether or not one of the novel compositions of matter described above or a classical composition of matter which changes from opaque to transparent with change in phases from solid to liquid), it is well to describe a device employing ortho-chloronitrobenzene and ortho-bromonitrobenzene recently constructed.

Referring again to FIG. 1, the heat conducting carrier means 2 is an aluminum foil of width 6 of approximately 0.003 inches (naturally, the heat conducting carrier means 2 must be a material which as a high thermal conductivity and relatively large surface area of contact with the test subject and be of minimum thickness, while preserving its structural integrity, in order to permit rapid conduction of heat into the cavity such as shown in FIG. 1. Where aluminum is used, its thickness may vary from about 0.001 inches to about 0.004 inches. In any event, the selection of such heat-conductive carrier means is well within the knowledge of those skilled in the art and needs no further elaboration). In a particularly effective embodiment, the heat conducting carrier means may be made of plastic. Thereby, the carrier is provided with the necessary strength to serve as the main structural support, while at the same time providing rapid and uniform temperature distribution throughout the thermometer device. As a consequence, the time required for taking temperature is substantially diminished. The depth 12 of cavity "A" in FIG. 1 is selected to be preferably 0.004 inches, with the upper horizontal width 9 being approximately 0.035 inches. The width 7 of the transparent film is approximately 0.001 inches, the letter being a painted letter on the bottom of the cavity "A". As implied in FIG. 1, a layer 11 of colorant material (paint) is stamped onto the bottom of each cavity "A" of a visible material that may be somewhat absorbed into the composition of matter or solid solution 5 upon melting of the "classical" solid solution 5 to make the colorant material more visible. The transparent film cover means 4 may be polypropylene, Mylar (polyethyleneterephthalate), nitrocellulose, polyvinyl chloride, etc. In FIG. 1, the transparent film cover means 4 is preferably a heat sensitive material and is a coextruded film of Nylon 6 ® (manufactured by the Allied Chemical Company) and Surlyn 1652 ® (manufactured by E. I. duPont deNemours & Company) which film is produced by Pierson Industries Incorporated that is subsequently laminated to polypropylene by the Millprint Company of Milwaukee, Wis.

In each cavity "A", such as that shown in FIG. 1, one of the predetermined compositions of matter that is associated with a predetermined melting point is poured into the cavity, filling approximately 60% of said cavity. After partial filling of each cavity "A" with a particular composition of matter (here OCNB:OBNB) associated with a temperature to be measured (here between 96.0° F. and 104.8° F.), transparent film 4 is put in sealing engagement with aluminum foil 2 through the use of machine such as the Webb Model No. 2 manufactured by Bio-Medical Sciences Inc. of Fairfield, N.J. As will be recognized by those skilled in the art, small deviations could be made in ratios of the widths 6 through 12, or alternatively, the ratios could be maintained for different sized systems (e.g., by multiplying distances 6 through 12 by a uniform but different constant) without substantially affecting the results of the invention.

Figure 2:
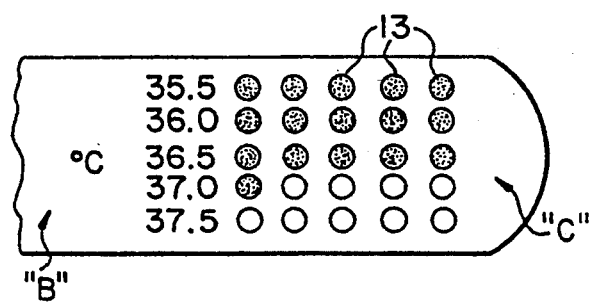
FIG. 2 is a partial overhead plan view of a device over a part of the clinical range of temperatures embodying the principles of the prior art U.S. Pat. No. 4,232,552 in degrees Celsius.

FIG. 2 presents a partial plan view from above and the side of one embodiment of the prior art thermometer of the '552 patent showing a heat conducting carrier means, "C", of a thermometer in a Celsius scale. In a particularly effective embodiment of this clinical thermometer, a rectangular grid is formed wherein each cavity 13 employs a construction as in FIG.1 and is clearly associated with a temperature to be determined within the range to be tested through markings located on the side of the grid.

Figure 3A:
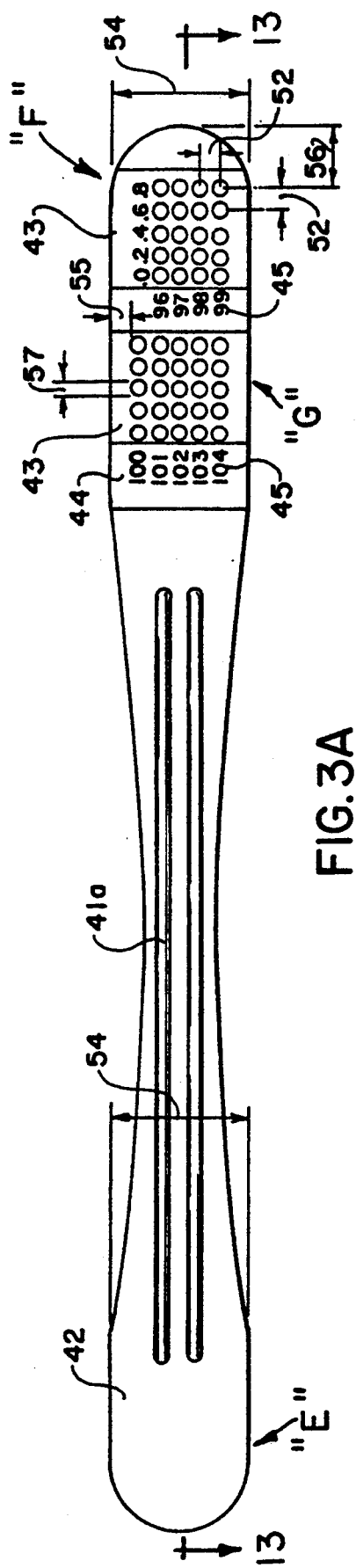
FIG. 3A and 3B are, respectively, a plan view of a prior art flat temperature indicating device comprising a heat conducting carrier means with a grid of cavities thereon; and an elevation view taken along line 13—1-3in FIG. 3A revealing the heat conducting carrier means within transparent cover sheet means and a bottom plate means.
Figure 3B:
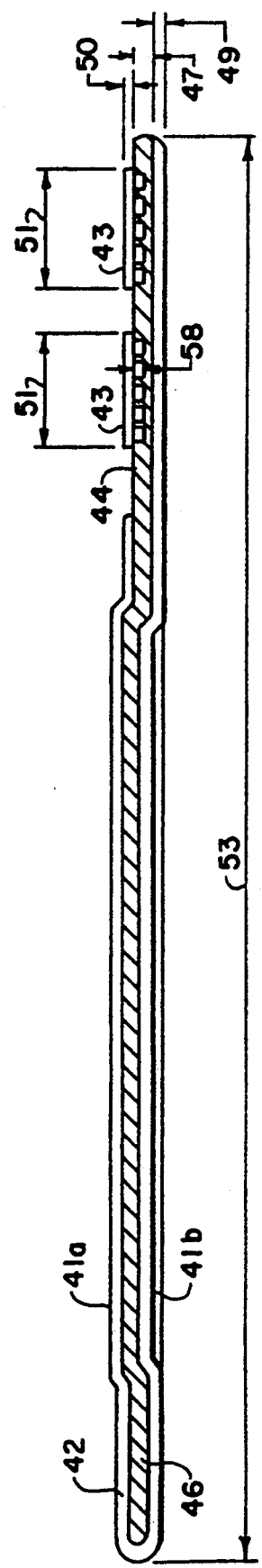

In FIGS. 3A and 3B, another embodiment of the prior art thermometer is disclosed for measuring temperatures at 0.2° F. increments from 96.0° F. to 104.8° F., combining the novel compositions of matter of the '552 patent (preferably OCNB:OBNB/pinacyanol iodide) with the novel cavities of FIG.1.

FIG. 3A displays a plan view of the substantially flat oral temperature indicting device as seen from above. Again, the thermometer has an aluminum heat conducting carrier means 44 (of thickness 47 in FIG. 3B) which acts not only as a main structural body of support, but at the same time provides rapid and uniform temperature distribution throughout the spatula portion "F" (having width 54 containing grid "G" of a plurality of cavities (each of diameter 57 and spaced center to center which each neighbor along a horizontal "x" axis or vertical "y" axis in FIG. 3A at a distance 52 apart) of FIG. 1, each cavity with the novel composition of matter and each associated with a predetermined temperature to be measured at 0.2° F. increments from 96.0° F. to 104.8° F., and each novel composition of matter substantially spherical void within said cavity. "Spatula"portion "F" of the device of FIG. is rounded for safety so that some distance, 56, is maintained between the most forward row of cavities and the edge of the device. It may be observed by those skilled in the art that if "classical" compositions of matter are employed in lieu of our novel compositions of matter, that each cavity will necessary employ an indicator layer such as layer 1 of FIG. 1.

Again in FIG. 3A, one will note that the aluminum heat-conducting carrier means is covered above for the entire handle "E" portion of the thermometer device by a top plastic layer 42 of width 54, preferable made out of a plastic such as polystyrene, polypropylene, or polyethylene.

Also in FIG. 3A, it will be recognized that the handle "E" has been stamped from below so as to make the device realize two ridges, ribs, or abutments 41a that protrude from above the carrier means 44 by some nominal distance which is approximately the same as nominal distance which is approximately the same as width 47 of carrier means 44; likewise, the device realizes two cavities 41b in carrier means 44 that parallel the ridges 41a. As will be appreciated by those skilled in the art, although the distances shown in FIGS. 3A and 3B can be readily adjusted with respect to one another or in proportion (widths 47, 48, 49, 50, 51, 52, 53, 54, 55, 56, 57, and 58 can be multiplied by different constants) it is well to describe a device for measuring human temperatures in the range of 96.0° F. to 104.8° F. that we recently constructed, employing ortho-chloronitrobenzene and ortho-bromonitrobenzene in a solvent system with pinacyanol iodide in the amount of 0.035% by weight to form a thermometer with the novel compositions of matter of this invention, which is the best mode of our invention and which is marketed by Organon Inc. (West Orange, N.J.) under the trademark TEMPA DOT READY STRIPE. Referring again to FIG. 12, the thermometer has a width 54 of about 0.345 inched at the widest portion of handle "E" and has the same width 54 of about 0.345 inches at the widest portion of handle "E" and has the same width 54 of about 0.345 inches in the spatula portion "F" of the thermometer. The cavities each have a diameter 57 of about 0.039 inches and each cavity has a depth of about 0.005 inches, and is spaced from each neighbor on a horizontal "x" axis or vertical "y" axis by a distance 52 of 0.015 inches. The top and bottom rows of cavities are of a distance 55 of about 0.039 inches from the leading edges, respectively, of the thermometer, and have a center line on the right-hand column which is a distance 56 of about 0.193 inches from the tip of the rounded edge of the spatula "G" portion of the thermometer. In FIG. 3B, taken along line 13—13 of FIG. 3A, it will be appreciated that the oral thermometer device has an overall length of 4.250 inches, and consists of an aluminum heat conducting carrier means 44 having an overall length of 4.250 inches and a depth 47 of about 0.003 inches. The aluminum head conducting carrier means 44 is covered on the handle portion "E" of the thermometer by a polypropylene or polystyrene layer of thickness 48 of about 0.003 inches; the carrier means also is in engagement with a polypropylene or polystyrene bottom plate mean 46 of width 49 of about 0.003 inches that traverses the entire length of the thermometer. Two bands of heat-sensitive material (coextruded film of Nylon 6 TM, and Surlyn 1652 TM, subsequently laminated to polypropylene) cover the two sub-grids (100° F. to 104.8° F. and 96.0° F. to 99.8° F.) and are each of width 51 of approximately 0.300 inches along the "x" axis and of depth 50 of from about 0.003 to about 0.005 inches.

Figure 4:
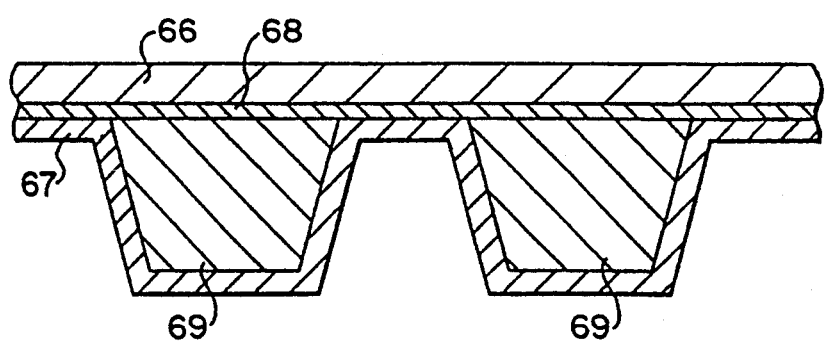
FIG. 4 is a cross-sectional view of a flat or gradually curved heat conducting carrier having a cavity defined therein, where a cover layer is bonded to a carrier layer by a pressure sensitive adhesive layer comprising polyisobutylene (PIB)

FIG. 4 depicts a cross-sectional view of the disposable thermometer of the prior art showing cavities in which are held the temperature-indicating system, 69. The heat conducting material, 67, is covered by a transparent layer, 66, by a polyisobutylene adhesive layer, 68.

Figure 5A:
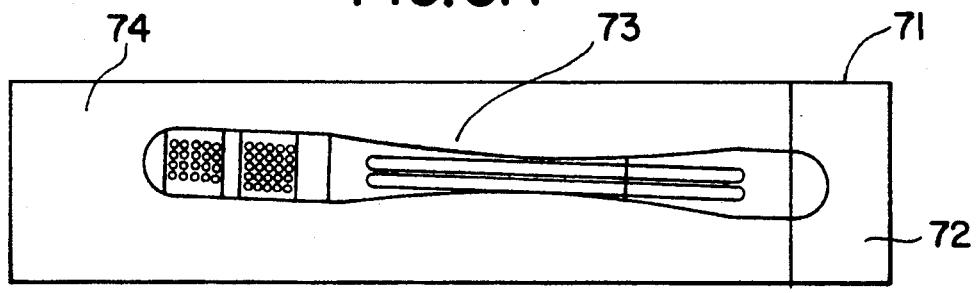

Referring now to FIG. 5A which depicts the package of this invention, the overlayer, 74, can be any suitable clear flexible transparent film. Illustrative non-limiting examples of such films are polyvinyl chloride, polypropylene, polyethylene, polyester resin films, e.g., Mylar ®, and composites or laminates thereof.

Illustrative, non-limiting examples of suitable, pressure sensitive adhesives include acrylic adhesives, silicone adhesives and latex based adhesives. Preferably the adhesive is one of the commercially available non-allergenic adhesives approved for contact with the skin. The adhesive is preferable transparent in the thickness used on the overlayer, 74. The adhesives are old in the art.

FIG. 5A depicts the package Of this invention in plan view. The package comprises a substrate, 71 coated with a releasing agent, having a thermometer, 73, is disposed on the substrate. An overlayer, 74, of transparent film coated with a pressure sensitive adhesive, is brought into contact with the substrate, 71, so as to enclose the thermometer, 73. In the package of FIG. 5A the overlayer, 74, is shorter in length than the substrate, 71, thereby exposing a portion of the handle end of the thermometer, 73, which can be used to aid in stripping the overlayer, 74, from the substrate, 71.

Figure 5B:
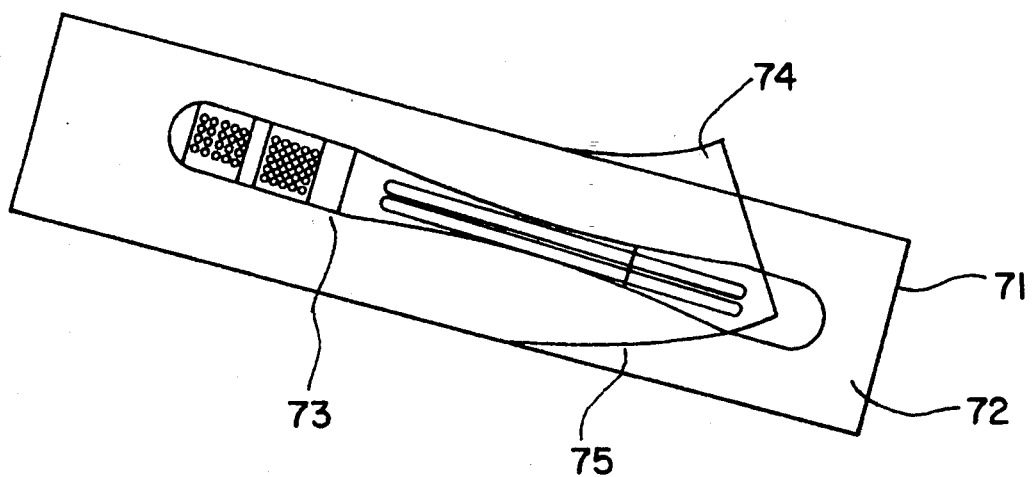
FIG. 5B shows a partially exploded view of the structure of the package of the invention.

Referring to FIG. 5B which is a partially exploded view of the package, a substrate, 71, is coated with a release agent, 72. A thermometer, 73, is disposed on the release surface. An overlayer, 74, of transparent film is coated with a pressure sensitive adhesive, 75. The overlayer, 74, is brought into contact with the release surface, 72 so as to enclose the thermometer. The adhesive layer, 75, is in intimate contact with the thermometer, 73, and adhered thereto. In use, the overlayer together with the thermometer is stripped from the substrate backing, 71, and adhered to the axillary area of the patient whose temperature is to be monitored.

In one embodiment no adhesive is applied to a portion of the overlayer, 74, to aid in ease of removal of the overlayer with the thermometer adhered thereto While FIG. 5A and 5B show the package of this invention utilizing a prior art oral chemical thermometer, it will be appreciated by those skilled in the art having access to this disclosure that only so much of the thermometer which consists of the indicating portion need be utilize where the temperature to be taken is other than an oral utilize where the temperature to be taken is other than an oral temperature.

Figure 5C:
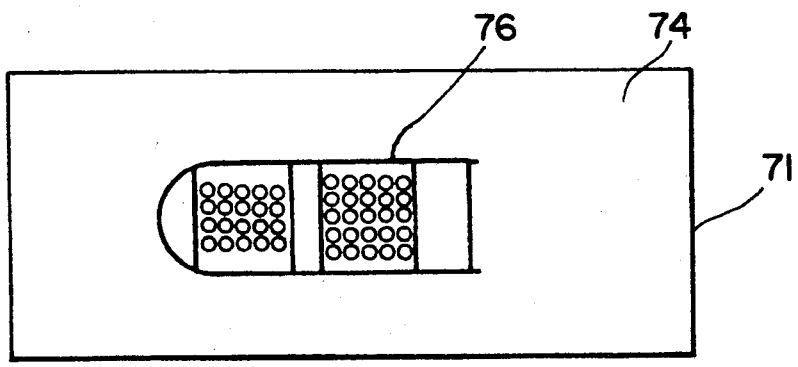
FIG. 5C shows a modified thermometer packaged accordance with this invention.

Referring now to FIG. 5C, a package is shown where the thermometer comprises only a temperature sensing device, 76, without the extraneous handle. As used in the specification and claims, the term temperature sensing device means the temperature-indicating portion of a clinical chemical thermometer. In one embodiment of the invention, an oral thermometer is not used. Oral temperatures and axillary temperatures are not identical. However, it is well known that axillary temperatures are about 1° F. lower than oral temperatures, and compensation can be made in reading the oral thermometer. In another mode of the invention the thermometer or temperature sensing device can be constructed so that the axillary temperature reads 98.6° F. as the normal temperature. This modification is well within the skill of those skilled in the art, and requires only an adjustment of the chemical compositions within each embossment. It will be appreciated by those skilled in the art having access to this disclosure, however, that axillary thermometry represents a small part of the disposable thermometer market. Hence, from the standpoint of economy, it is more feasible to dedicate a part of the ordinary oral thermometer production to the package of this invention, making the necessary correction in reading, rather than the more expensive route of manufacturing a separate temperature-indicating means for that purpose.

The preferred chemical thermometer is the thermometer of Hof, U.S. Pat. No. 4,232,552 wherein the temperature sensing composition comprises a solid solution of ortho-chloronitrobenzene and ortho-bromonitrobenzene in combination with an organic moiety of the Hof '552 disclosure. The composition of the solid solution is varied in accordance with the disclosure of Hof, '552, so that each embossed pocket contains a solid solution of different composition, and consequently, different melting point. The preferred organic moiety is pinacyanol iodide.

It will be appreciated by those skilled in the art having access to this disclosure that, while the chemical thermometer is described as having embossed pockets to accept the temperature sensitive compositions, consistent with the disclosure of Hof '552, all that is required is discrete regions of temperature sensitive materials separated from one another by an impenetrable barrier.

The adhesives useful in the practice of this invention which are approved for skin contact are generally termed medical adhesives, and are available from the Medical specialties division of 3M Corporation and Adhesives Research, Inc. among others.

It will be appreciated by those skilled in the art having access to this disclosure that in addition to providing a package for a clinical thermometer, there is provided as a result of the structure of the package, a means for applying the thermometer to the axillary area of a patient whose temperature is to be monitored.

The distinguishing features of the package of this invention are an overlayer coated with an adhesive composition; a releasing agent coated backing to which the overlayer is applied and the thermometer which is enclosed in the package. Because the overlayer is coated with an adhesive, the thermometer adheres to the overlayer which is releasably adhered to the backing. When the overlayer is stripped from the backing it carries with it the thermometer. Because the overlayer, as seen from the drawings, is substantially larger than the thermometer, there is an exposed area of adhesive coated overlayer. This overlayer is used as a means for adhering the thermometer to the axillary area of a patient whose temperature is to be monitored. The dimensions of the overlayer as compared to the thermometer are not critical other than that the overlayer is larger in size than the thermometer. Generally, it is sufficient if the overlayer is about twice the width of the thermometer, preferably about three times the width of the thermometer. While the overlayer width can approach the width of the thermometer and reliance can be made upon the length of the overlayer exceeding the length of the thermometer, thereby providing means for adhering the thermometer to the axillary area of a patient, this is not preferred. In such a structure there is less adhesive overlayer area to hold the thermometer in contact with the patients skin.

Typically, with a chemical clinical thermometer having a width of about ⅜ of an inch, an overlayer width of about one inch can be utilized successfully. For such a thermometer as the width is reduced significantly below one inch the probability that the thermometer can be dislodged from the patients skin by movement is increased. As will be appreciated by those skilled in the art having access to this disclosure the overlayer width can be increased above one inch, but no significant benefit in doing so is achieved.

What is claimed is:

1. A package for adapting a clinical chemical thermometer to axillary use comprising:
   (a) a substrate having a surface coated with a release agent;
   (b) a clinical chemical thermometer, having a width dimension, disposed on the substrate; and
   (c) a transparent overlayer film having a surface of the film coated with a pressure sensitive adhesive, said adhesive coated surface being in juxtaposition with the thermometer and the release agent coated surface of the substrate, the overlayer film having a width greater than the width of the thermometer; the thermometer being adhered to the overlayer film and being sealed within the package formed by the substrate and the overlayer film, the overlayer film being releasably adhered to the substrate, the thermometer remaining adhered to the overlayer film when the overlayer film is released from the substrate, thereby providing an exposed adhesive coated area of overlayer film by means of which the thermometer can be applied to a patient's axillary area.

2. The package according to claim 1 wherein the substrate comprises paper.

3. The package according to claim 1 wherein the release agent is a silicone based release agent.

4. The package according to claim 1 wherein the film is a polypropylene film.

5. The package according to claim 1 wherein the pressure sensitive adhesive is non-allergenic.

6. The package according to claim 1 wherein the clinical thermometer comprises a heat conducting carrier having at least one spaced region defined therein to determine a like number of predetermined temperatures in a predetermined temperature range, said spaced regions containing a like number of different temperature indicating compositions therein, each a solid solution, said carrier having a transparent cover sheet means in sealing engagement therewith, and with a single solid solution being deposited in each of said regions and being associated with a single one of said predetermined temperatures, each temperature indicating composition exhibiting a sharp color change upon transition from a solid state to a liquid state, and consisting essentially of:
   (a) a solvent, said solvent being a temperature responsive composition forming a solid solution in the solid state and adapted to change from a solid to a liquid state substantially at a predetermined temperature; and
   (b) an effective amount of at least one organic moiety dissolved in and inert towards said solvent being adapted to change the color of the composition visible to the naked eye upon the change in state at substantially the predetermined temperature when so dissolved, said organic moiety being selected from one of the groups consisting essentially of:
      (1) at least one of a Group III body of compounds consisting of pinacyanol iodide, quinaldine red, 1,1'-diethyl-2,2'-cyanine iodide, pinacyanol chloride, thionin, methylene blue, cresol red, chlorophenol red, neutral red iodide, neutral red chloride, crystal violet, acridin orange, Toluidin Blue O TM, Orasol Orange RLN TM, Orasol Navy Blue TM, Irgalith Red PR TM, Fat Red BS TM, methyl violet, Xylene Cyanol FF TM, Rhodamine 6G TM, Rhodanine B TM, Irgalith Magenta TCB TM, irgalite pink TYNC TM, Toluidine Blue O, Savinyl Green B TM, Savinyl Blue RS TM, purpurin 3,3'-diethylthiadicarbocyanine iodide, cryptocyanine, Dicyanine A TM, Merocyanine 540 TM, 4-(p-ethoxyphenylazo)-m-phenylene diamine monohydrochloride, Yellow Orange S TM, Chrysoidin G TM, fuchsin, aurintricarboxylic acid (ammonium salt), Victoria Blue R TM, Pyronin G TM, gallein, phloxine, Erythrosin Yellow Blend TM, chlorophenol blue, bromophenol blue, bromocresol purple, Coriphosphine O TM, acriflavine, acridine orange, rhoduline violet, Alizarin Cyanin 2R TM, Alizarin Red S TM, alcannin, Aurantia, Direct Green G TM, Fast Red Salt 3GL TM, Fast Blue Salt BB TM, Fast Garnet Salt GBC TM, Carta Yellow G 180 o/o TM, murexide, Savinyl Blue GLS TM, Irgalith Blue GLSM TM, phthalocyanine, Di Amingreen B TM, Alizarin Blue S, Celliton Blue Extra TM, neocyanine, Janus Green, dimethyl yellow, Fast Yellow, Methyl red sodium salt, Alizarin yellow R TM, Eriochrome Black T TM, Chromotrope 2R TM, Ponceau 6R TM, Brilliant Ponceau G/R/2R TM, chromolan yellow, Sudan Red B TM, Bismarck brown G TM, Fat Black TM, Resorcin Brown TM, Benzofast pink 2BL TM, Oil Red EGN TM, Euroglaucine, Fuchsin NB TM, parafuchsin, Patent Blue TM, Irgalith Blue TNC TM, Phloxin B TM, fluorescein sodium salt, Rhodamine B base TM, Eosin Scarlet, Esoin Yellowish TM, Erythrosin extra bluish, 4,5-dibromoflucorescein, ethyleosin, Phloxine TM, Cyanovin B TM, chlorocresol green, pinacyanol bromide, 2-(p-dimethylaminostyryl)-1-ethyl pryidinium iodide ethyl red, neutral red iodide, nigrosine, savinyl blue B TM, Orasol Blue BLN TM, Safranin O TM, Azocarnun G TM, Phenosafranine, Azocarmine BX TM, Solophenyl Brilliant Blue BL TM, Nile Blue A TM, gallocyanine, gallamine blue, celestine blue, methylene green, Azure A/B/C TM, Blue VIF Organol TM, Alizarin, Nitrofast Green GSB TM, quinalizarine, Oil Blue N TM, Solvay purple, Ciba Blue TM, Indigo synthetic TM, Chromophtal Bordeaux RS TM, Thiorifolex TM, Acid Alizarin Red B TM, 5-Aminoflourescein, Rose Bengal TM, Martius Yellow TM, Chicago Blue 6B TM, Alcian Blue 8GX TM, Cresyl violet, 4,4' Bis(dimethylamino)-benzylhdrol, Zinc Pthalocyanine, Sudan III TM, Pyronin Y TM, Toluylene Blue TM, cresyl violet perchlorate, Mendola's Blue TM, Phosphine Dye, Nitron TM, cresyl violet acetate, Ceres Orange R TM, 4-phenylazo-1-naphtylamine, 4-(4-Dimethylamino-1-napthylazo)-3-methoxybenzene sulfonic acid, Bindschedler's Green TM, and p-(p-dimethylaminophenylazo) benzoic acid;

(2) a binary mixture of:
(A) at least one of a Group I body of compounds soluble in said solvent consisting of the halogenated sulfonphthaleins and the organic acids having a pK$_1$ of less than or about four; and
(B) at least one of a Group II body of compounds consisting of the aminotriphenylmethane and their soluble salts, 8-hydroxyquinoline, and the cyanines;

with the proviso that if the Group II compounds consist solely of at least one aminotriphenylmethanes or their soluble salts, then the Group I compound must be selected from at least one of the group consisting of oxalic acid, suitable soluble sulfonic acids and the tetrahalogenated sulfonphthaleins, and the other soluble organic acids having a pK$_1$ of less than or about 2, and wherein the weight ratio of the Group I body of compounds to the Group II body of compounds is more than or about 3 to 1; and (3) at least one of the aforesaid Group III body of compounds with at least one of the Group I or Group II bodies of compounds.

7. The package according to claim 6 wherein the temperature responsive composition comprises a solid solution of o-chloronitrobenzene and o-bromonitrobenzene.

8. The package according to claim 7 wherein the organic moiety comprises pinacyanol iodide.

9. An axillary thermometer package comprising:
(a) a substrate having a surface coated with a release agent;
(b) a temperature sensing device, having a width dimension, disposed on the substrate; and
(c) a transparent overlayer film having a surface of the film coated with a pressure sensitive adhesive, said adhesive coated surface being in juxtaposition with the temperature sensing device, and the release agent coated surface of the substrate, the overlayer film having a width greater than the width of the temperature sensing device;
the temperature sensing device being adhered to the overlayer film and being sealed within the package formed by the substrate and the overlayer film, the overlayer film being releasably adhered to the substrate, the temperature sensing device remaining adhered to the overlayer film when the overlayer film is released from the substrate, thereby providing an exposed adhesive coated area of overlayer film by means of which the temperature sensing device can be applied to a patient's axillary area.

10. The package according to claim 9 wherein the substrate comprises paper.

11. The package according to claim 9 wherein the release agent is a silicone based release agent.

12. The package according to claim 9 wherein the film is a polypropylene film.

13. The package according to claim 9 wherein the pressure sensitive adhesive is non-allergenic.

14. The package according to claim 9 wherein the temperature sensing indicating means comprises a heat conducting carrier having at least one spaced region defined therein to determine a like number of predetermined temperatures in a predetermined temperature range, said spaced regions containing a like number of different temperature-indicating compositions therein, each a solid solution, said carrier having a transparent cover sheet means in sealing engagement therewith, and with a single solid solution being deposited in each of said regions and being associated with a single one of said predetermined temperatures, each temperature-indicating composition exhibiting a sharp color change upon transition from a solid state to a liquid state, and consisting essentially of:
(a) a solvent, said solvent being a temperature responsive composition forming a solid solution in the solid state and adapted to change from a solid to a liquid state substantially at a predetermined temperature; and
(b) an effective amount of at least one organic moiety dissolved in and inert towards said solvent being adapted to change the color of the composition visible to the naked eye upon the change in state at substantially the predetermined temperature when so dissolved, said organic moiety being selected from one of the groups consisting essentially of:
(1) at least one of a Group III body of compounds consisting of pinacyanol iodide, quinaldine red, 1,1'-diethyl-2,2'-cyanine iodide, pinacyanol chloride, thionin, methylene blue, cresol red, chlorophenol red, neutral red iodide, neutral red chloride, crystal violet, acridin orange, Toluidin Blue O TM, Orasol Orange RLN TM, Orasol Navy Blue TM, Irgalith Red PR TM, Fat Red BS TM, methyl violet, Xylene Cyanol FF TM, Rhodamine 6G TM, Rhodanine B TM, Irgalith Magenta TCB TM, irgalite pink TYNC TM, Toluidine Blue O, Savinyl Green B TM, Savinyl Blue RS TM, purpurin 3,3'-diethylthiadicarbocyanine iodide, cryptocyanine, Dicyanine A TM, Merocyanine 540 TM, 4-(p-ethoxyphenylazo)-m-phenylene diamine monohydrochloride, Yellow Orange S TM, Chrysoidin G TM, fuchsin, aurintricarboxylic acid (ammonium salt), Victoria Blue R TM, Pyronin G TM, gallein, phloxine, Erythrosin Yellow Blend TM, chlorophenol blue, bromophenol blue, bromocresol purple, Coriphosphine O TM, acriflavine, acridine orange, rhoduline violet, Alizarin Cyanin 2R TM, Alizarin Red S TM, alcannin, Aurantia, Direct Green G TM, Fast Red Salt 3GE TM, Fast Blue Salt BB TM, Fast Garnet Salt GBC TM, Carta Yellow G 180 o/o TM, murexide, Savinyl Blue GLS TM, Irgalith Blue GLSM TM, phthalocyanine, Di Amingreen B TM, Alizarin Blue S, Celliton Blue Extra TM, neocyanine, Janus Green, dimethyl yellow, Fast Yellow, Methyl red sodium salt, Alizarin yellow R TM, Eriochrome Black T TM, Chromotrope 2R TM, Ponceau 6R TM, Brilliant Ponceau G/R/2R TM, chromolan yellow, Sudan Red B TM, Bismarck brown G TM, Fat Black TM, Resorcin Brown TM, Benzofast pink 2BL TM, Oil Red EGN TM, Euroglaucine, Fuchsin NB TM, parafuchsin, Patent Blue TM, Irgalith Blue TNC TM, Phloxin B TM, fluorescein sodium salt, Rhodamine B base TM, Eosin Scarlet, Esoin Yellowish TM, Erythrosin extra bluish, 4,5-dibromoflucorescein, ethyleosin, Phloxine TM, Cyanovin B TM, chlorocresol green, pinacyanol bromide, 2-(p-dimethylaminostyryl)-1-ethyl pryidinium iodide ethyl red, neutral red iodide, nigrosine, savinyl blue B TM, Orasol Blue BLN TM, Safranin O TM, Azocarnun G TM, Phenosafranine, Azocarmine BX TM, Solophenyl Brilliant Blue BL TM, Nile Blue A TM, gallocyanine, gallamine blue, celestine blue, methylene green, Azure A/B/C TM, Blue VIF Organol TM, Alizarin, Nitrofast Green GSB TM, quinalizarine, Oil Blue N TM, Solvay purple, Ciba Blue TM, Indigo synthetic TM, Chromophtal Bordeaux RS TM, Thiorifolex TM, Acid Alizarin Red B TM, 5-Aminoflourescein, Rose Bengal TM, Martius Yellow TM, Chicago Blue 6B TM, Alcian Blue 8GX TM, Cresyl violet, 4,4' Bis(dimethylamino)-benzylhdrol, Zinc Pthalocyanine, Sudan III TM, Pyronin Y TM, Toluylene Blue TM, cresyl violet perchlorate, Mendola's Blue TM, Phosphine Dye, Nitron TM, cresyl violet acetate, Ceres Orange R TM, 4-phenylazo-1-naphtylamine, 4-(4-Dimethylamino-1-napthylazo)-3-methoxybenzene sulfonic acid, Bindschedler's Green TM, and p-(p-dimethylaminophenylazo) benzoic acid;

(2) a binary mixture of:
 (A) at least one of a Group I body of compounds soluble in said solvent consisting of the halogenated sulfonphthaleins and the organic acids having a $pK_1$ of less than or about four; and
 (B) at least one of a Group II body of compounds consisting of the aminotriphenylmethane and their soluble salts, 8-hydroxyquinoline, and the cyanines;

with the proviso that if the Group II compounds consist solely of at least one aminotriphenylmethanes or their soluble salts, then the Group I compound must be selected from at least one of the group consisting of oxalic acid, suitable soluble sulfonic acids and the tetrahalogenated sulfonphthaleins, and the other soluble organic acids having a $pK_1$ of less than or about 2, and wherein the weight ratio of the Group I body of compounds to the Group II body of compounds is more than or about 3 to 1; and (3) at least one of the aforesaid Group III body of compounds with at least one of the Group I or Group II bodies of compounds.

15. The package according to claim 14 wherein the temperature responsive composition comprises a solid solution of o-chloronitrobenzene and o-bromonitrobenzene.

16. The package according to claim 15 wherein the organic moiety comprises pinacyanol iodide.

* * * * *